United States Patent [19]

Ishii et al.

[11] 3,819,513
[45] June 25, 1974

[54] AUTOMATIC CLEANING ARRANGEMENT FOR ELONGATED TUBULAR OBJECTS
[75] Inventors: Kiyoshi Ishii; Syobu Konomi, both of Saitama; Yoshio Ishiguro, Tokyo, all of Japan
[73] Assignee: Daicel Ltd., Osaka, Japan
[22] Filed: Aug. 21, 1972
[21] Appl. No.: 282,449

[30] Foreign Application Priority Data
Aug. 26, 1971 Japan.............................. 46-65385

[52] U.S. Cl................................. 210/23, 210/321
[51] Int. Cl............................................ B01d 31/00
[58] Field of Search ............ 210/23, 321, 353, 355

[56] References Cited
UNITED STATES PATENTS
3,425,562 2/1969 Hamer........................... 210/353 X
3,552,574 1/1971 Lowe et al......................... 210/353

OTHER PUBLICATIONS
McCutchan et al., "Reverse Osmosis at Coalinga, California," a paper presented, 1969, at Awwa Annual Conf., copying p. 176, from Journal AWWA, pp. 346–353.

Primary Examiner—Frank A. Spear, Jr.
Attorney, Agent, or Firm—Woodhams, Blanchard and Flynn

[57] ABSTRACT

Two or more screens are located within a piping system and a sponge ball or balls are disposed in the system for movement back and forth between the screens. By switching valves installed in the piping system, the sponge ball or balls are automatically and intermittently moved back and forth to clean the piping system.

9 Claims, 6 Drawing Figures

PATENTED JUN 25 1974  3,819,513

AUTOMATIC CLEANING ARRANGEMENT FOR ELONGATED TUBULAR OBJECTS

BACKGROUND OF THE INVENTION

1. Field of the Invention

This invention relates to an arrangement for cleaning slime from the inner surface of a piping system by forcibly moving a sponge ball or balls therethrough under the pressure of the liquid flowing through the system.

More particularly, the invention relates to an arrangement whereby the movement of a sponge ball or balls back and forth through the system is effected by switching valves automatically and intermittently.

2. Description of the Prior Art

Usually in the processes of filtration, ultra-filtration, and reverse osmosis, the larger the amount of water that permeates through the filter material or the membrane surface, the greater is the amount of slime that is deposited on the filter material or membrane surface. This causes a serious problem of reduced permeability of the filter material or membrane.

In the process of reverse osmosis as applied, particularly to the desalination, concentration, or separating purification of feed liquid, the drop of the permeability of the semipermeable membrane as time passes due to slime deposition thereon not only reduces the liquid-purifying capacity of the plant, i.e., the total volume of purified product liquid obtained per unit time is reduced, but also lowers the degree of removal of the solute from the feed liquid being treated, thus affecting the quality of the purified product liquid that is obtained, i.e., the total dissolved solids in the product liquid increases.

Heretofore it has been customary in reverse osmosis procedures to prevent the concentration polarization and slime deposition on the membrane surface by operating under conditions for the liquid supply so as to make the liquid flow on the semipermeable membrane turbulent, and to lessen the effect of the slime by installing a suitable filter upstream of the membrane in the piping system.

This customary practice has the disadvantages that the filter does not prevent completely the deposition of slime and, when the feed liquid treated is such as to make difficult the installation of a filter upstream in the piping system, for example, when the feed liquid has a fine suspensoid or emulsoid dispersed therein, the drop of the membrane permeability as time passes takes place too rapidly.

Especially when an aqueous solution of natural protein, e.g., cheese whey, egg white, or fish meal leaching water, is concentrated, the fat deposition on the membrane surface can be another cause for the low permeability. The deposition on the membrane of solids from the liquid in the course of concentration by passage through the membrane is further responsible for a material drop of the permeability.

It is known to clean the semipermeable membrane of a reverse osmosis system, after it has been operated for a predetermined period of time, by stopping the operation of the system and introducing a spongy ball or balls into the system. When a liquid is treated which gives a high amount of deposit on the membrane, this procedure has only limited practical value because it involves repeated stops and restarts of the operation of the system, thereby causing a corresponding time loss and extra operation cost for a variety of reasons.

The present invention makes it possible to clean slime deposit from the membrane surface and to clean the piping automatically at any desired cycle time, while continuing normal operation of the system with substantially no downtime. The invention thus provides many advantages, for example, avoiding substantial drop of the permeability and substantial reduction of the product liquid quality, utilizing simple but highly reliable equipment.

The present invention will be further described in connection with the embodiments thereof shown in the accompanying drawings.

SUMMARY OF THE INVENTION

This invention provides a cleaning arrangement which is particularly useful for cleaning a reverse osmosis apparatus having a cylindrical semipermeable membrane. According to the invention, one to several sponge balls, each having a diameter of from one to 2.5 times as large as the inside diameter (ranging from ½ to 2 inches) of a cylindrical semipermeable membrane, is introduced into the piping system of the equipment. The inner surface of the cylindrical semipermeable membrane is cleaned by automatically and intermittently switching solenoid controlled valves during the operation of the equipment to cause the sponge ball or balls to move through the interior passage of the membrane, thereby to remove slime therefrom.

DETAILED DESCRIPTION OF THE INVENTION

Figure 1:
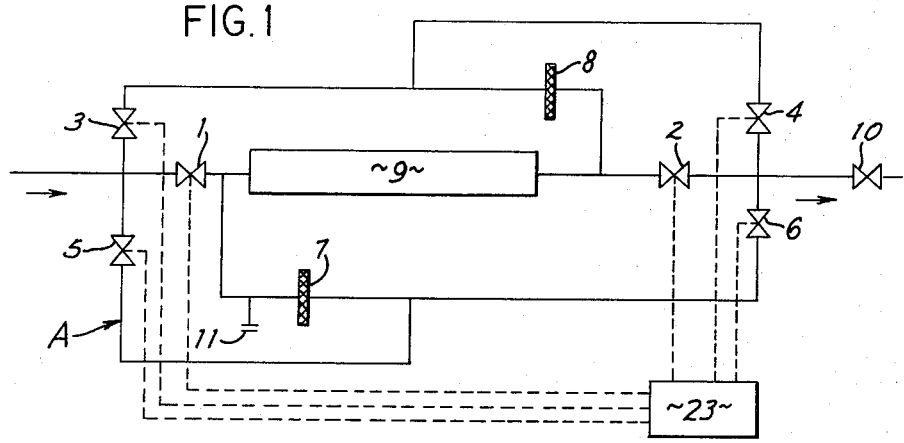
FIG. 1 is a schematic flow diagram illustrating an embodiment of the invention.
Figure 3:
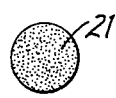
FIG. 3 is a plan view of a sponge ball for use in the invention.

FIG. 1 is a schematic illustration of a cylindrical semipermeable-membrane module equipped with the automatic cleaning feature, according to the invention. The reference character A indicates a piping system having solenoid controlled valves 1 through 6 installed therein. The system also includes screens 7 and 8, a cylindrical semipermeable-membrane module 9, a pressure-regulating valve 10, and a port 11 through which a sponge ball or balls 21, as shown in FIG. 3, can be introduced into and taken out of the piping system A, specifically between the screens 7 and 8.

When the system A is in normal operation, the solenoid controlled valves 1, 2 are open and the valves 3, 4, 5 and 6 are closed. The feed liquid flows under high pressure through valve 1 into the module 9. The concentrate flows out through valves 2 and 10. The concentrate is a liquid stream containing the solids separated from the feed liquid by the membrane. The purified product water is removed from the system from the zone outside the membrane by conventional means not illustrated in FIG. 1.

When the inner surface of the cylindrical semipermeable-membrane module 9 is to be cleaned with the sponge ball or balls placed in advance through port 11 into the piping system A, and while the feed liquid is flowing through the cylindrical membrane in the same direction as in normal operation, the solenoid controlled valves 4, 5 are opened and the solenoid valves 1, 2, 3 and 6 are closed. Thus, the feed liquid flows through valve 5 and screen 7, thence through the module 9, screen 8 and valve 4 to the valve 10, thence to concentrate outlet conduit. The ball or balls are thereby moved from port 11 through module 9 to screen 8.

Figure 4:
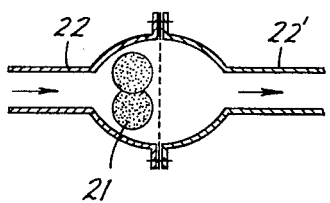
FIG. 4 is a fragmentary diagrammatic sectional view showing the sponge ball of FIG. 3 passing through and cleaning a cylindrical semipermeable membrane module in accordance with this invention.

As illustrated in FIG. 4, the sponge ball 21 cleans the inside of the cylindrical membrane 9 as it passes therethrough. As illustrated in FIG. 4, the ball 21 is resiliently compressed into snug sliding contact with the membrane so that it applies a pressure against the membrane to insure an effective wiping action for removing the slime. The ball 21 is intercepted by the screen 8, whereas the liquid flows on through the screen 8 and thence through the solenoid controlled valve 4 and the pressure-regulating valve 10.

Next, in order to move the sponge ball 21 in the reverse direction through the membrane of the cylindrical semipermeable-membrane module 9, the solenoid controlled valves 3, 6 are opened while valves 1, 2, 4 and 5 are closed. The sponge ball 21 is forced by the liquid away from the side of the screen 8 closer to the semipermeable-membrane module 9 and it is driven through the module 9 and is caught by the side of the screen 7 closer to the module 9, and the liquid flows through the screen 7, valve 6 and the pressure-regulating valve 10 to the concentrate outlet conduit.

The solenoid controlled valves 1 through 6 are connected to a cycle timer 23 by an electric sequence circuit and the cycle timer operates to effect a suitably chosen switching cycle. It should, of course, be appreciated that the valves are not limited to two-way solenoid valves. The number of valves can be reduced by using three-way or even four-way valves instead.

Figure 2:
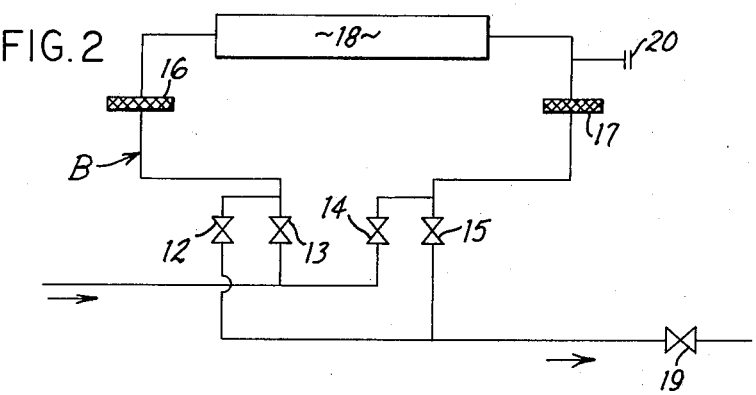
FIG. 2 is a schematic flow diagram of another embodiment of the invention.

FIG. 2 shows a modified form of the invention, i.e., a cleaner in which the cleaning sponge ball or balls can be left continuously in a constant flow system. In FIG. 2 the character B designates a piping system having solenoid controlled valves 12 to 15 installed in the system. There are also provided screens 16, 17, a cylindrical semipermeable-membrane module 18, a pressure-regulating valve 19, and a port 20 through which the sponge ball or balls inserted between the screens 16, 17 can be taken out of the piping system B. At preset time intervals the pair of solenoid controlled valves 12, 14 are opened and the pair of valves 13, 15 are simultaneously closed, and vice versa. By the repetition of the opening and closing cycle at regular intervals, the inner surface of the cylindrical semipermeable-membrane module 18 is automatically and intermittently cleaned by moving the ball from screen 16 to screen 17, and vice versa.

The sponge ball 21 (as shown in FIG. 3) which is used in the afore-described arrangements preferably has closed, non-communicating cells, although an open, connected cell structure is not objectionable. During the operation, the sponge ball 21 does not pass through any of the solenoid controlled valves, and there is no danger that it will be caught up by or clog any valve, thus making the arrangement more reliable in performance.

Figure 5:
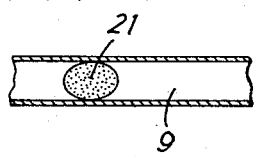
FIG. 5 is a diagrammatic sectional view of a screen for use in the invention.
Figure 6:
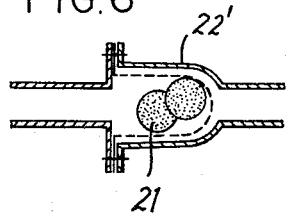
FIG. 6 is a diagrammatic sectional view of a modified form of the screen.

With certain feed liquids it is necessary to clean the system only at relatively long intervals, and in such a case the solenoid controlled valves may, of course, be replaced by hand operated valves. The screens 7, 8 which intercept the sponge balls may be meshes, grills or screens of any type, which desirably have an equivalent mesh size small enough to prevent the passage of the balls therethrough, but the screen openings are as large as possible to minimize the flow resistance. The screens 7 and 8, or 16 and 17 may be installed, for example, as shown in FIG. 5, by outwardly expanding the joined ends of pipes 22, 22' and stretching the screen between the expanded pipe ends or, as shown in FIG. 6, by outwardly expanding the joined end of one pipe 22' to a cylindrical form and then inserting a cylindrically shaped screen into the cylindrical pipe end.

The advantageous effects that are obtained by the use of the arrangement according to the present invention will be illustrated by the following examples.

EXAMPLE 1

Using a cylindrical semipermeable membrane 9 having an inside diameter of half an inch and operating under a feed pressure of 600 psi, brine was desalted and the following results were obtained.

The sponge ball 21 used was the same in quality as a commercially available kitchen sponge.

|  | Initial values | Values after 400-hour run | Values after cleaning with 1″-dia. sponge ball |
| --- | --- | --- | --- |
| Permeability | 1.05 m³/m²/day | 0.82 m³/m²/day | 1.03 m³/m²/day |
| Salt rejection | 94.5% | 94.1% | 94.6% |

EXAMPLE 2

The same procedure as described in Example 1 was repeated except that fish meal leaching water was treated instead of brine. The results were as follows.

The sponge ball 21 used was equivalent to the one employed in the preceding example.

|  | Initial values | Values after 8-hour run | Values after cleaning with 1"-dia. sponge ball |
|---|---|---|---|
| Permeability | 0.71 m³/m²/day | 0.43 m³/m²/day | 0.69 m³/m²/day |
| Protein rejection | 97.5% | 96.9% | 97.1% |

EXAMPLE 3

The same procedure as described in Example 1 was repeated except that the brine was replaced by waste pulp liquor, and the following results were obtained.

The sponge ball 21 used was equal in quality to a commercially available rubber sponge mattress.

|  | Initial values | Values after 15-hour run | Values after cleaning with 1"-dia. sponge ball |
|---|---|---|---|
| Permeability | 1.35 m³/m²/day | 0.26 m³/m²/day | 1.36 m³/m²/day |
| COD rejection | 96.7% | 95.4% | 96.3% |

EXAMPLE 4 AND CONTROL EXAMPLE

Under the same conditions as used in Example 1 except that the brine was replaced by waste pulp liquor containing hemicellulose, the test equipment was operated for about 30 hours. In one 30 hour run the equipment was stopped after the passage of 15 hours and the semipermeable-membrane was washed once. In another run the equipment was automatically washed every hour. The average permeability values and the average COD rejection measured were as follows:

|  | Permeability | COD rejection |
|---|---|---|
| One wash on the 15th hour | 0.40 m³/m²/day | 96.9% |
| One wash per hour | 0.87 m³/m²/day | 97.1% |

We claim:

1. An apparatus for removing dissolved or suspended solids from a liquid, which comprises:
    an elongated, tubular, porous assembly for passing a portion of the liquid through the pores of said assembly and for limiting passage of said solids therethrough, said porous assembly defining an elongated internal chamber having first passage means extending from one end thereof and second passage means extending from the other end thereof;

inlet means connected to a source of pressurized feed liquid;
    outlet means for discharging the remainder of the liquid from said chamber of said porous assembly;
    first valve means connected between said inlet means, on the one hand, and said first and second passage means, on the other hand, for alternatively directing said pressurized feed liquid from said inlet into one end or the other end of said chamber;
    second valve means connected between said outlet means, on the one hand, and said first and second passage means, on the other hand, for alternatively directing the remainder of the liquid from one end or the other end of said chamber into said outlet means;
    said first and second valve means being operable in coordination with each other so that the feed liquid flows in one direction or in the opposite direction through said chamber;
    first conduit means connected to said first passage means and having first screen means therein, said first conduit means being coupled to said first and second valve means for flowing liquid in one direction or the opposite direction therethrough in response to the settings of said first and second valve means;
    second conduit means connected to said second passage means and having second screen means therein, said second conduit means being coupled to said first and second valve means for flowing liquid in one direction or the opposite direction therethrough in response to the settings of said first and second valve means;
    said first and second screen means being disposed outside of said assembly and connectible in series between the opposite ends of said chamber and said inlet and outlet means in response to the settings of said first and second valve means;
    one or more resiliently compressible objects disposed between the screen means for movement back and forth between the screen means and through said chamber in response to the pressure of said pressurized feed liquid, said first and second conduit means being free of valves between said screen means so that the object or objects can freely move between said screen means in response to the pressure of said pressurized feed liquid, said object or objects being of a size capable of wiping along the wall of said chamber to removed deposits therefrom.

2. An apparatus according to claim 1, in which said object is a sponge ball having a diameter at least as large as the internal diameter of said chamber.

3. An apparatus according to claim 2, in which the diameter of the ball is in the range of from one to 2.5 times the internal diameter of said chamber.

4. An apparatus according to claim 1, in which a port is connected to one of said first and second conduit means between the screen means therein and the passage to which said one conduit means is connected for adding the objects to and removing them from the apparatus.

5. An apparatus according to claim 1, in which said assembly comprises a cylindrical semipermeable membrane.

6. An apparatus according to claim 1, including a cycle timer connected to said first and second valve means for effecting automatic cyclic operation thereof.

7. An apparatus according to claim 1, in which said first valve means comprises first and second valves both connected in series with said inlet means and said second valve means comprises third and fourth valves connected in series to said outlet means, said first conduit means comprising a first pipe connected to the first and third valves and said second conduit means comprises a pipe connected to said second and fourth valves.

8. An apparatus according to claim 1, in which said first valve means comprises a first valve connected directly between said inlet means and said first passage, a second valve connected in series between said inlet means and said first conduit means, and a third valve connected in series between said inlet means and said second conduit means; said second valve means comprises a fourth valve connected directly between said outlet means and said second passage, a fifth valve connected in series between said outlet means and said first conduit means and a sixth valve connected in series between said outlet means and said second conduit means.

9. A process for purifying aqueous feed liquid containing dissolved and/or suspended solids, which comprises:

continuously feeding said feed liquid under pressure and in unidirectional flow through a tubular semipermeable membrane and recovering a stream of concentrate containing a larger amount of said solids than is contained in said feed liquid and also recovering a permeate stream of purified water, at regular intervals during the flow of said feed liquid, reversing the direction of flow of the feed liquid through said membrane and simultaneously moving one or more resilient compressible objects under the pressure of said feed liquid from beyond one end of said membrane through the interior of said membrane and thence beyond the other end of said membrane to remove slime from said membrane.

* * * * *